United States Patent
Park

(10) Patent No.: US 9,658,100 B2
(45) Date of Patent: May 23, 2017

(54) SYSTEMS AND METHODS FOR AUDIO INFORMATION ENVIRONMENTAL ANALYSIS

(71) Applicant: NEW YORK UNIVERSITY, New York, NY (US)

(72) Inventor: Tae Hong Park, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 14/629,312

(22) Filed: Feb. 23, 2015

(65) Prior Publication Data
US 2015/0245139 A1    Aug. 27, 2015

Related U.S. Application Data

(60) Provisional application No. 61/942,869, filed on Feb. 21, 2014.

(51) Int. Cl.
*H04R 29/00* (2006.01)
*G01H 3/12* (2006.01)

(52) U.S. Cl.
CPC .................................. *G01H 3/125* (2013.01)

(58) Field of Classification Search
CPC ............................................... G10H 2250/531
See application file for complete search history.

(56) References Cited

U.S. PATENT DOCUMENTS

| | | | | |
|---|---|---|---|---|
| 2004/0258248 | A1* | 12/2004 | Schnitta | G01H 15/00 381/58 |
| 2005/0174238 | A1* | 8/2005 | Foseide | G08B 13/1418 340/568.4 |
| 2008/0045156 | A1* | 2/2008 | Sakhpara | G01N 33/0063 455/67.11 |
| 2012/0224706 | A1* | 9/2012 | Hwang | G10L 15/10 381/56 |
| 2012/0250581 | A1* | 10/2012 | Bilcu | G08B 25/009 370/254 |
| 2014/0161270 | A1* | 6/2014 | Peters | G10L 25/51 381/63 |
| 2015/0134418 | A1* | 5/2015 | Leow | G06Q 30/0205 705/7.34 |

FOREIGN PATENT DOCUMENTS

WO    WO2013/150349    * 10/2013

* cited by examiner

*Primary Examiner* — Joseph Saunders, Jr.
*Assistant Examiner* — James Mooney
(74) *Attorney, Agent, or Firm* — Foley & Lardner LLP

(57) ABSTRACT

An environmental analysis system and method. Remote sensing devices detect nonvisual information. One or more loudspeakers are each associated with one or more of the plurality of remote sensing devices to determine acoustic properties of an area. Another implementation relates to a method for environmental analysis where non-visual information is detected. The non-visual information is classified and is communicated to a server.

8 Claims, 14 Drawing Sheets

SYSTEMS AND METHODS FOR AUDIO INFORMATION ENVIRONMENTAL ANALYSIS

CROSS-REFERENCE TO RELATED APPLICATIONS

This application claims priority to U.S. Provisional Application No. 61/942,869, filed Feb. 21, 2014, reference of which is hereby incorporated in its entirety.

BACKGROUND OF THE INVENTION

Modern mapping systems have drastically changed the way we interact with the world. It is not that long ago that people used foldable maps to navigate from point A to point B. With the introduction and ubiquity of cellular networks, the Internet, and GPS technology, mapping paradigms have fundamentally changed our mode of interaction and engagement with the environment and learn about our surroundings quickly, effectively, and efficiently. Although maps have become more interactive, most of the interaction reflects physical objects such as streets, buildings, parks, and lakes. The focus of maps is on providing visual information about a location, particularly distilled to provide information about the physical objects. Furthermore, maps are still very much static—maps are not updated with much frequency as the physical objects on the map, such as buildings, parks and lakes in reality do not change much over long periods of time.

Humans, however, do not interact with the environment through visual feedback alone. Although the presence or absence of a physical object may important information, the mere presence of an object does not convey all of the information of interest. As a matter of fact, humans sense the world in at least a number of fundamental ways: through vision, hearing, touch, heat, and smell. Visual feedback technologies have advanced impressively with the development of technologies such as Google® maps and the like that focus on enhancing the presentation and "depth" of visual information. However, non-visual information is still underdeveloped and underrepresented in mapping.

SUMMARY OF THE INVENTION

One implementation relates to an environmental analysis system comprising a plurality of remote sensing devices. Each remote sensing device has at least one microphone, a central processing unit, a communication module, and a power source. One or more loudspeakers are each associated with one or more of the plurality of remote sensing devices.

Another implementation relates to a method for environmental analysis. Non-visual information is detected. The non-visual information is classified. The non-visual feature is communicated to a server.

Another implementation, a computer-implemented machine for environmental analysis comprising a processor and a tangible computer-readable medium operatively connected to the processor and including computer code. The computer code is configured to: detect non-visual information; classify the non-visual information; communicate the non-visual feature to a server.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE PREFERRED EMBODIMENTS

Figure 1:
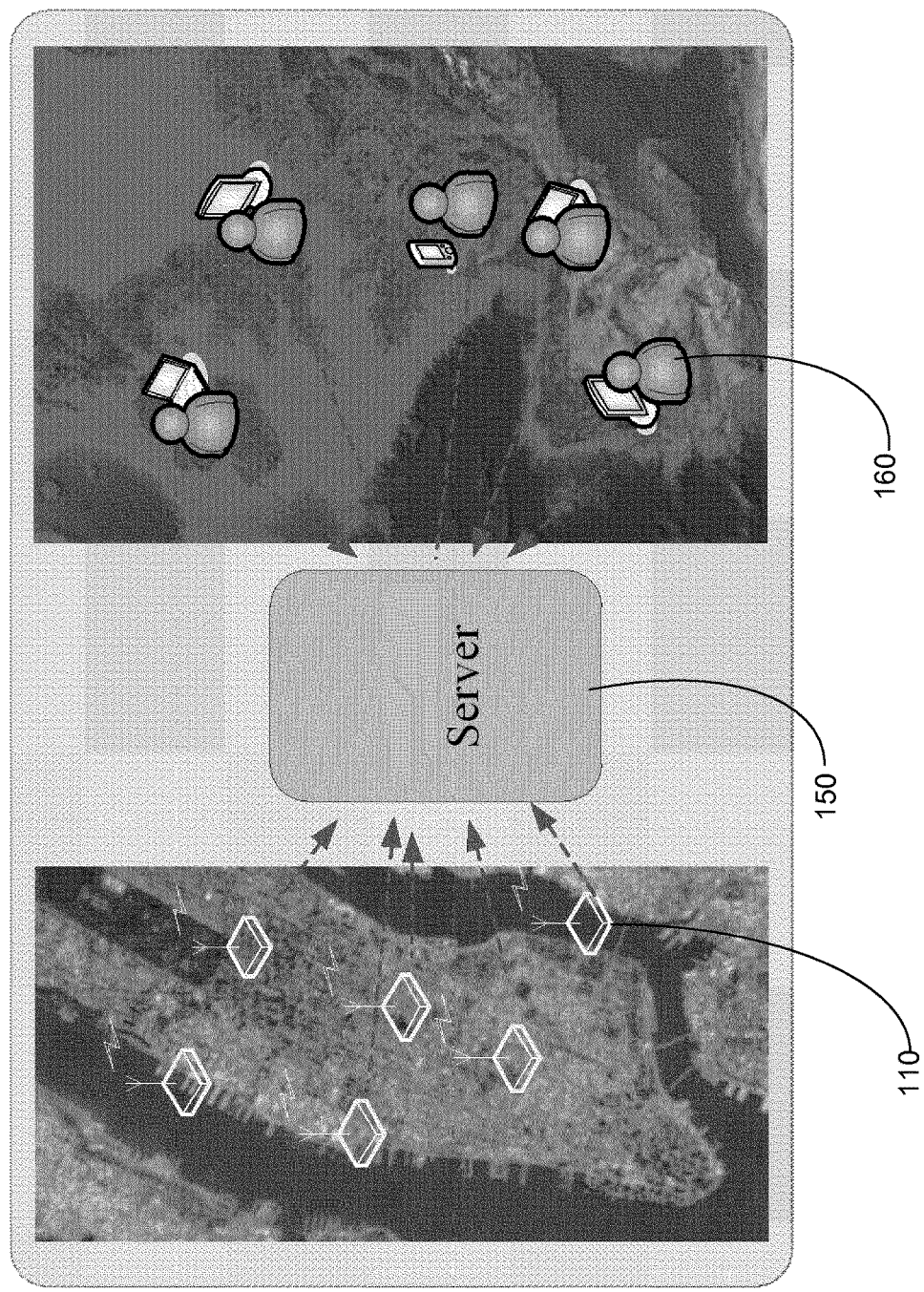
FIG. 1 illustrates one implementation of a environmental analysis system setup.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In one implementation, an environmental analysis system 101 enables a multimodal sensory representation of a physical environment through one or more of a sensor network, digital signal processing techniques, visualization techniques, and multi-modal machine learning techniques. One implementation of a system 101 is shown in FIG. 1 where a plurality of sensors 110 (or sensor networks 111), server 150, and client computing devices 160 form a poly-sensory environment user experience via urban acoustic technology and infrastructure such as Citygram technology.

Figure 2:
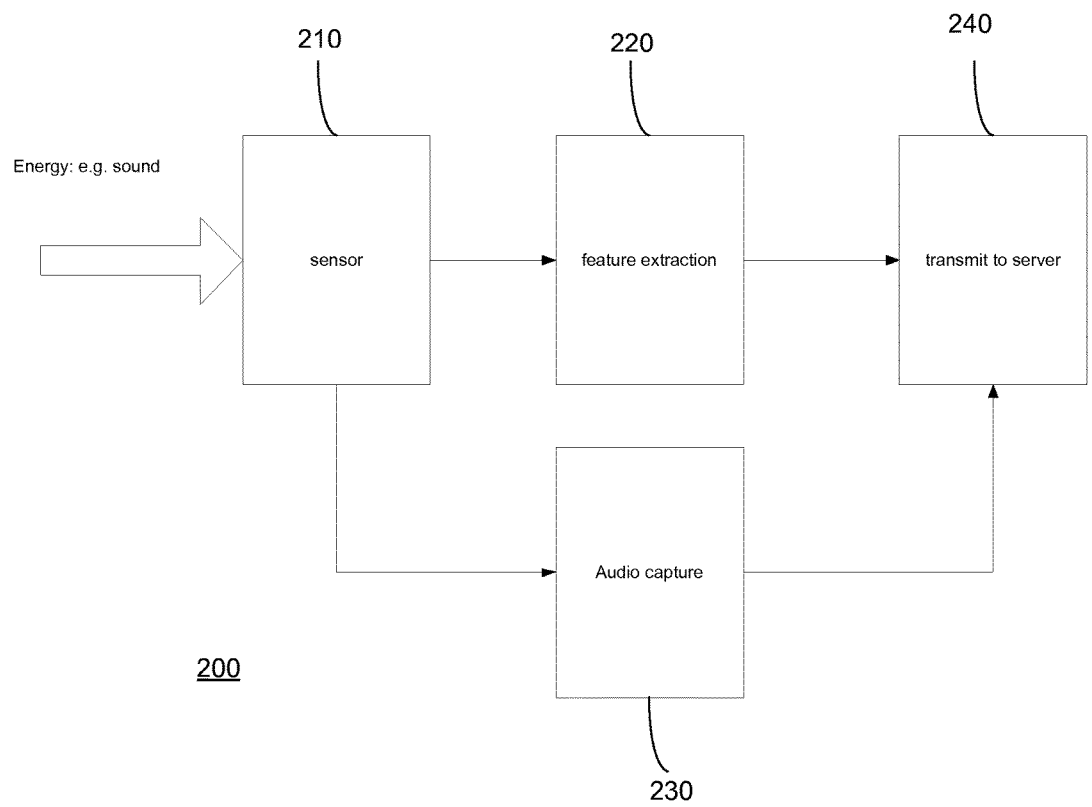
FIG. 2 is a flowchart for one implementation of an environmental analysis sensor and data transmission system.

Sensor 110 may comprise one or more individual sensor devices for detecting environmental information. In one implementation, the sensor 110 comprises one or more remote sensing devices (RSDs). The RSDs may be organized into a sensor network 111. The real-time sensor device 110 may be implemented in number of ways depending on sensor availability. In one implementation the RSD 110 is a mini-PC (for example, the size of large jump-drive) that runs on the Android® OS. This device has a built-in microphone, WiFi®, and Bluetooth® communication connectivity, and additional I/O including USB ports for further sensor upgrade. In another implementation a simple smartphone is used by using onboard sensors and wireless communication technologies. The RSD 110 itself can be placed on a table, on custom stand, by a window sill, or any location and surface that allows proper capturing of a given acoustic space. The spatial data such as acoustic data, terrestrial vibration data, humidity, smell, light characteristics, etc. are gathered by the remote sensing devices 110. In one embodiment, the spatial date is measured and processed by the remote sensing devices 110. The remote sensing devices 110 communicate with a server 150. In one implementation, the spatial data undergoes processing and machine learning at the server 150. One implementation of a system 101 is shown in FIG. 2. The method 200 of FIG. 2 includes sensor information capture 210 which provides for feature extraction 220 and audio capture 230 with the extracted feature and captured audio transmitted to the server 240.

In one implementation, clients and users can access relevant data that is streamed to the server 150 in real-time or quasi-real-time. An example of such data stream is spatio-acoustic data streams. The data can be provided via a visualization web interface or an API that can be incorporated with standard browsing technologies and maps using HTML5, php, javascript, and other computer coding languages as necessary. One implementation for a system 101 allows for spatial data to be provided for the real-estate industry.

Figure 3:
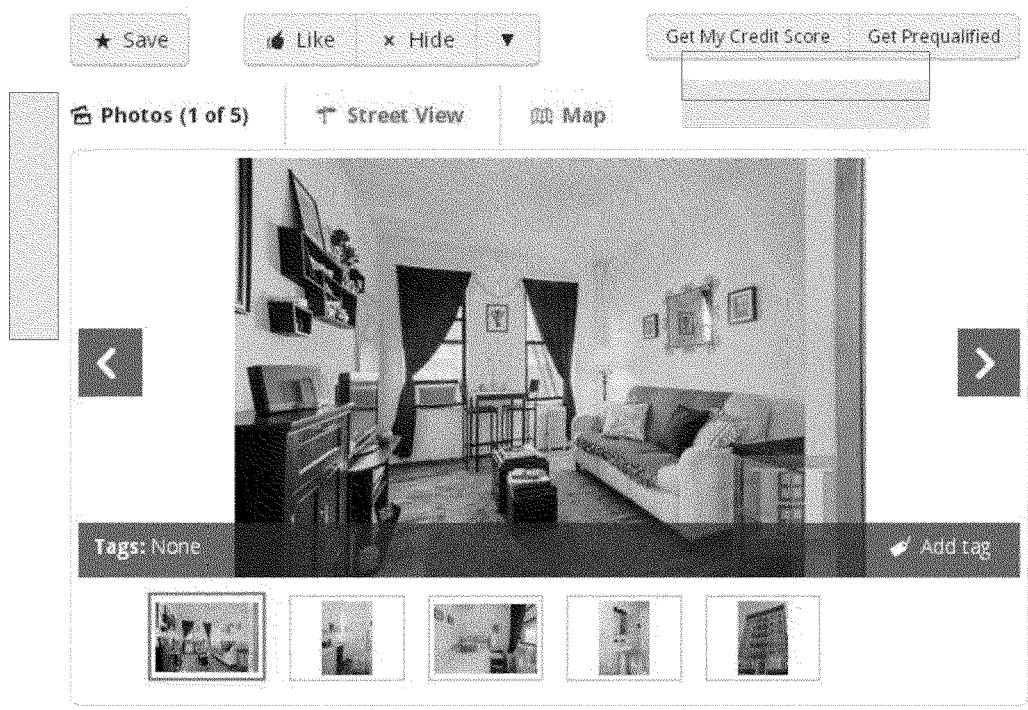
FIG. 3 illustrates a one implementation of a visual interface via webpage property browsing.

FIG. 3 shows an example where a client visits an available property via a web-browser. The typical real-estate web-browser contains essentially visual information, typically in the form of a number of pictures, and other (mostly) static data that is not reflective of the dynamicity of a room, space, and neighborhood; and there is no way to determine the sound pollution quality of a property, for example. The environmental analysis system 101 allows for multimodal and real-time or quasi-real-time interaction with a space which allows for an augmented experience of a given property such as a single unit home or rental property in an apartment.

Figure 4:
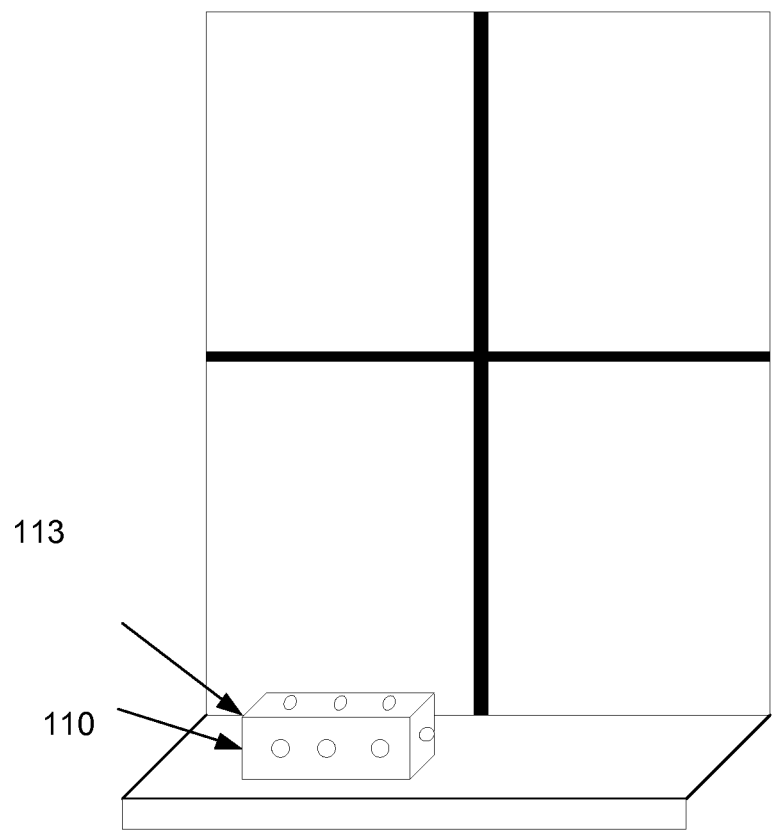
FIG. 4 shows an implementation of environmental analysis remote sensing device where it is placed near a window sill.

The system 101 can be adapted for real estate applications to provide data relating to non-visual information. FIG. 4 shows an implementation example of RSD 110 where it is placed near a window sill, providing data, for example, of the sound audible at the window.

In one implementation the environmental analysis system 101 shows a number of microphone sensors 113 to capture the spatio-acoustics of a room, for example. The device can operated with a battery or can be connected to a power outlet for uninterrupted operation.

In one implementation, an environmental analysis main box 170 is equipped with (1) at least one sensor 110, and with one, a selection of, or all of the following (but not limited to) components (2) WiFi® hardware and software, (3) cellular hardware and software, (3) power supply, (4) rechargeable battery, (5) power supply connection to AC supply, (6) Ethernet hardware, (8) CPU, and (9) other communication hardware such as Bluetooth.

In one embodiment, a communication module 130 allows for captured data (such as sound streams) to be streaming to the server for automatic analysis which can also be accessed by a client user for a particular webpage service such as real-estate web-browsing service. Analysis may also occur on the environmental analysis RSD 110 itself; and other distributed computing strategies may be employed to help in efficiently processing and streaming data to clients.

The sensors 110 can be limited to one, a small number, or as many as needed to capture sound and echo (microphone sensor or sensors 113), humidity/moisture (moisture sensor or sensors), temperature, low frequency vibration (e.g. subway rumble via accelerometer or microphones, for example), air quality, light, color, smell, and electromagnetic radiation. In the case of microphones 113, a single microphone or an array of microphones may be used to capture overall acoustic impression of a space, specific and directional sound characteristics via acoustic beamforming and microphones, and reflection characteristics. A number of different microphones may be used according to needs. This includes but is not limited to Micro Electrical-Mechanical System (MEMS) microphones that is very small in size, very efficient as it is etched into a silicon chip and is often integrated with a preamplifier. In one implementation, an array of MEMS microphones can be used to render a beamforming setup for focused, directional sound pick-up. In another implementation, multiple microphones comprise a multichannel measurement setup where each channel can individually be analyzed for acoustic information.

Figure 5:
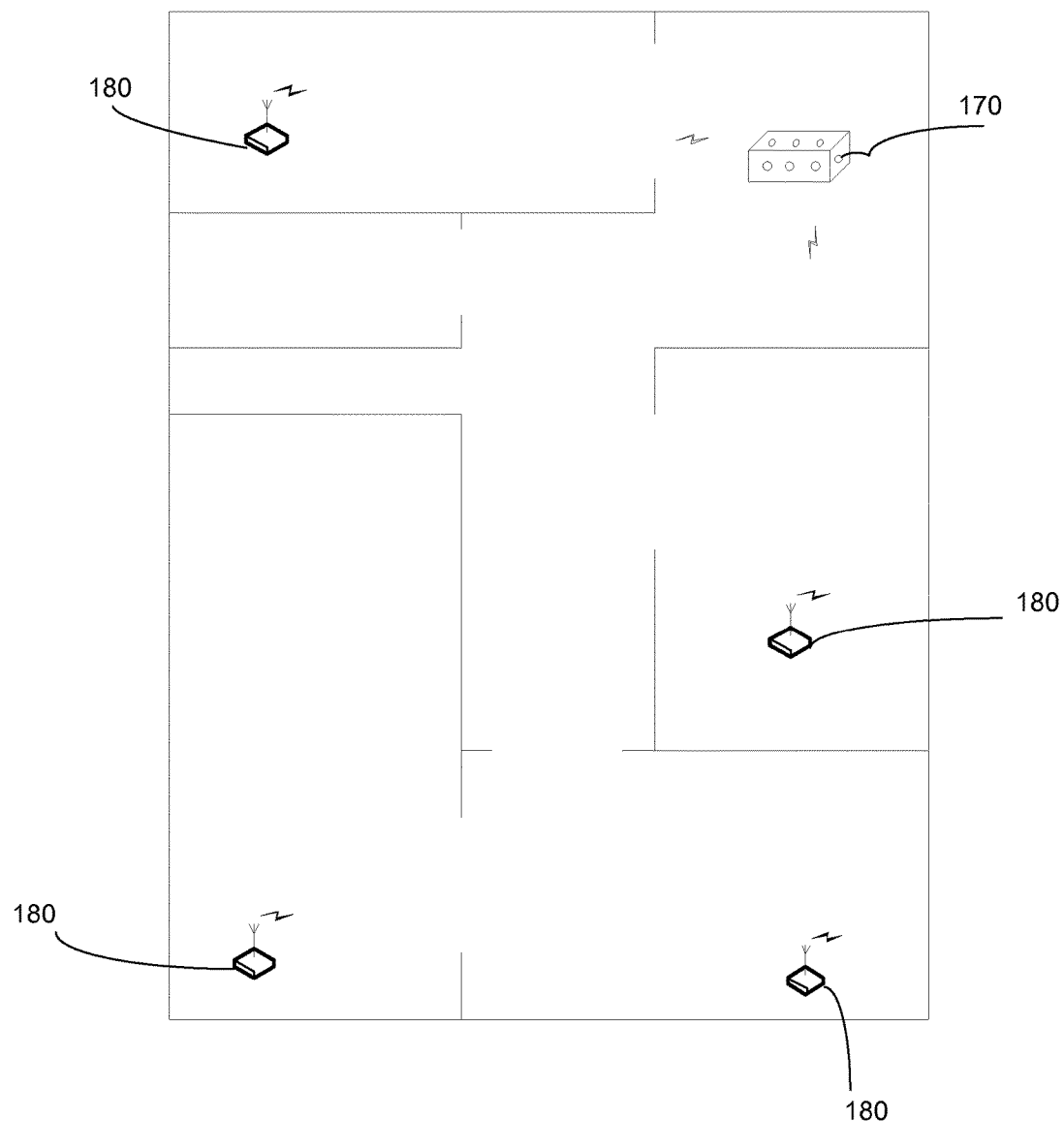
FIG. 5 shows an implementation with a main environmental analysis device and a number of mini environmental analysis devices.

Alternatively the system 101 may also include a surface or contact microphone 114 that can allow it to be attached flat to an object such as a window, wall, or floor, allowing monitoring of sounds that travel through the object and also allows for capturing outdoor sounds. Surface and contact microphones are generally attached to surface unlike general microphones that typically are on handheld or on microphone stands. The general microphone captures change in air pressure, whereas the surface/contact microphones measure vibrations that propagate in solids such as windows, tables, and guitar bodies. An example includes, but is not limited to a piezo microphone, In another implementation, shown in FIG. 5, the environmental analysis main device 170 can be coupled with add-on mini environmental analysis devices 180 that extend the range of the sensor network 111 so that more accurate and larger coverage of the home is possible. Each mini environmental analysis device 180 may include one or more of the components included in the environmental analysis main device 170. The mini environmental analysis device 180 may include reduced communication capabilities compared to the main device 170, such that the mini environmental analysis device 180 can communicate with the main device 170 but are not capable of independent communication directly to the server 150. The mini environmental analysis devices 180 can communicate with the main environmental analysis device 170 via mesh networking hardware and software and each mini environmental analysis device 180 can be have a number of sensors 110 such as microphones.

In the case of microphones as the sensors 110 for the environmental analysis system 101, a poly-sensory experience of a real-estate property can be experienced through a real-estate webpage that is currently the standard method for searching for apartments and homes. The difference with the environmental analysis system 101 is that a property such as a single home, apartment, or duplex can be experienced by the client with much more accuracy in lieu of visual information alone, such as pictures, that is standard Internet-based home browsing. With the environmental analysis system 101, a client will be able to hear the sound of the property in real-time or in quasi-real-time depending on network latency and set up. Alternatively, past sounds can be archived on a server so that a larger temporal soundmap can be rendered. In another implementation, the microphone 113 is provided with directionality. For example, having an antenna with a telescoping microphone having angular flexibility. Thus, the microphone can be manipulated to change the zone of detection.

Figure 6:
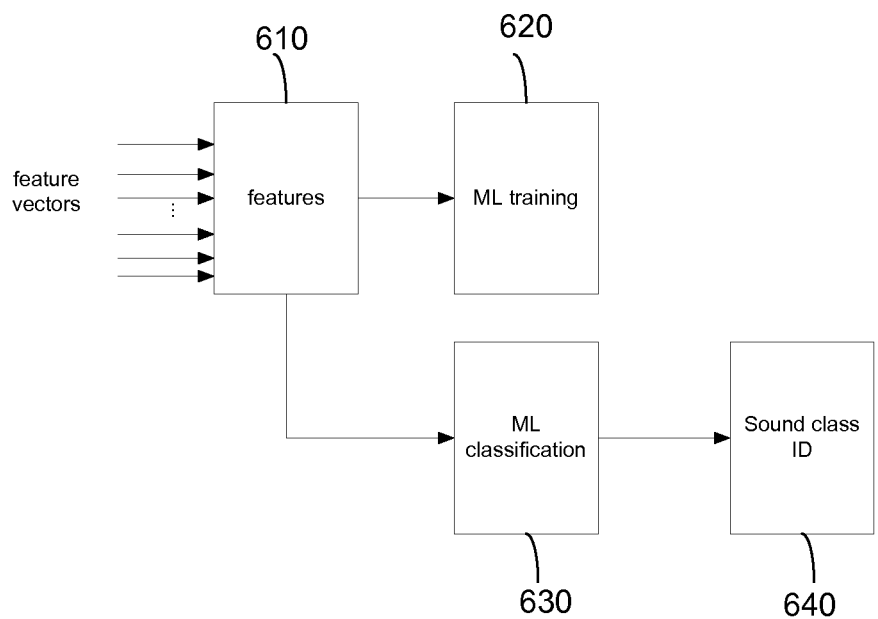
FIG. 6 is a flow chart illustrating the use of machine learning techniques to automatically classify sound that the environmental analysis remote sensing device senses.

In another implementation, the environmental analysis RSDs 110 which extract acoustic features in the case of microphone sensors, can stream low-level acoustic feature vectors to the server. On the server 150, the incoming acoustic features vectors are used to classify the sounds that the environmental analysis RSDs 110 transmit. That is, in one implementation, using machine learning (ML) techniques, a server ML module will automatically classify in real-time or near real-time the sound that the RSDs 110 capture. The process is shown in FIG. 6 for one implementation of a classification method 600. The acoustic features are identified 610. The machine learning device is trained 620, which may include manual training based on identified acoustic features or using a training module. Once the machine learning device is trained, machine learning classification 630 is used to identify the acoustic features. The classified acoustic features are then assigned to a sound class or otherwise identified 640.

Once ML training is complete, ML classification can take place. This means that the incoming feature vectors from the environmental analysis RSDs 110 will be classified by the ML classifier and results will be available for access and use through the environmental analysis server 150 and API. Text descriptions can be provided as a summary of the classified sounds to provide an overview and specifics of the ambiance and sound signature of an area. For example, sound classes such as barking dogs, honking sounds, sirens, construction and jackhammer sounds, screaming and loud music sounds from bars next door, gunshot sounds, subway sounds, bird sounds, etc. are automatically classified and stored on the server. This data will be available as additional information for the client browsing the webpage of a real-estate webpage via the environmental analysis API, for example. In turn, as the acoustic events and sound IDs can be stored on the server, a historic "soundmap" can also be provided for the client seeking to find a quiet home, for example. The acoustic event detection (AED) and acoustic event classification (AEC) is implemented in software once the audio data is captured. AED and AEC uses frequency-domain and time-domain feature extraction algorithms (e.g. spectral spread, spectral centroid, RMS energy, etc. and derivates of the measurements) to accomplish automatic sound object recognition and classification. In short, the system engages in what is known as computational audio scene analysis (CASA).

Figure 7:
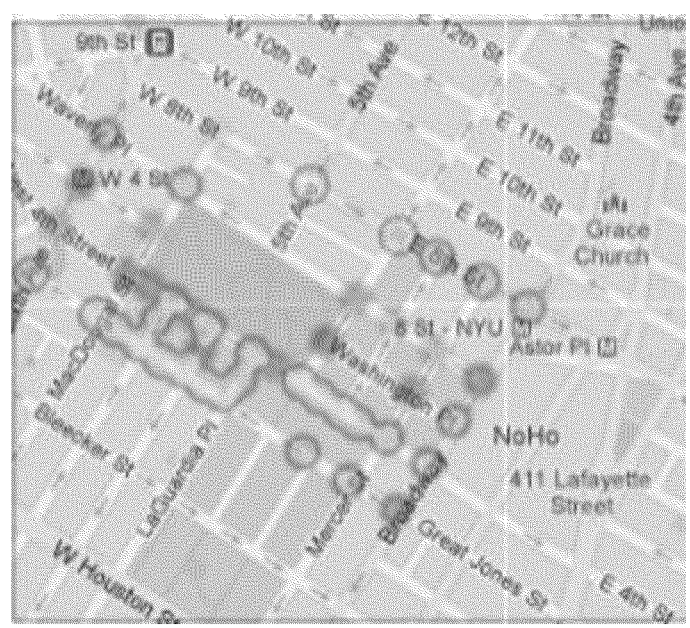
FIG. 7 illustrates an implementation of a heat map type visual, where acoustic energy is visualized.

In one implementation, a RSD 110 in a first room can emit sound from a loudspeaker and a RSD in a second room can detect the sound as it is transmitted to that room. Thus, information regarding the transmission of sound throughout a structure can be determined, such as to aid a user in determining the noise pollution from a living area as it would impact a sleeping area. The system 101 may be implemented in urban project, such as those utilizing payphone locations for listening stations and is implemented by a number of key technologies: (1) sensors that measure the environment, (2) server that collects sensor data, (3) computer code that analyzes the data, and (3) interactive interfaces that allow users to interact with the data. The user interaction may be implemented using Google Map API and graphic animation overlays on top of Google Maps. For example, sensors deployed in physical spaces measure acoustic energy which is sent to the server for collection. The data is then accessed by a user from a web-browser (smartphone or any generic computing device with Internet connectivity), viewed via standard mapping systems such as Google Maps. In this scenario one can see and hear the acoustic energy in a given space through heatmaps, for example as shown in FIG. 7.

In this context, not only will the client be able to determine the acoustic quality of the property at the moment, the client will be able to determine the sound quality of the home and visualize, as well as actually listen to, the sounds that occur around the home for as long as the environmental analysis RSDs 110 have been deployed. In a typical real-estate application the real-estate agent will take one or a number of environmental analysis RSDs 110 and deploy them on the property using one main environmental analysis device 170 with additional mini environmental analysis devices 180, for example.

The environmental analysis RSDs 110 will be left running until the property is sold and/or off the market. At this time, the agent will collect the RSDs 110 and deploy them on other new properties. The data captured by the RSDs 110 will remain archived on the environmental analysis server for future rental/home sale services. The environmental analysis RSD sensors 110 may be shut down remotely or alternatively turned on. In another implementation, a loudspeaker or loudspeakers may be connected wirelessly or through wires to the environmental analysis main device 170 to produce an impulse signal. The "impulse response" will allow for capture of the acoustic properties (e.g. reflective, dampened, etc.) which can be further provided as information to clients.

As mentioned above, a number of different sensors 110 may be installed on the environmental analysis RSD 110 including a multi or single axis accelerometer. The accelerometer can be used to measure low-frequency vibration such as terrestrial vibration—subway passing by, earthquakes, heavy trucks that shake a building, for example. The accelerometer can also be used to provide an indication of building movement, such as swaying of high-rise buildings, or low frequency shaking of floors, walls, and ceilings. The moisture sensor may be used to monitor humidity and moisture levels. Other sensors 110 may provide additional information for the client, which are archived on the environmental analysis server. The methodology for multisensory computational analytics is fundamentally identical to FIG. 6 where the input is a collection of feature vectors from each sensor type (e.g. mic has a number of features, light sensor has its own features), and the classification results of each analysis module pertinent to each sensor is used to inform classification decisions.

As the environmental analysis RSD 110 can engage in multi-modal capture of data types such as acoustic energy, light energy, smell, and moisture, the combinations of information can be used to identify the underlying source or classify the data as associated with an identified event. For example, these elements can also be used to improve the machine learning algorithms in more robustly classifying a particular class of sound. For example, the sound of a train passing by captured by microphones and simultaneously captured by the accelerometer (physical shaking) can, in combination, help the ML classification algorithm better determine the class of sound that the sensors are capturing.

Figure 9:
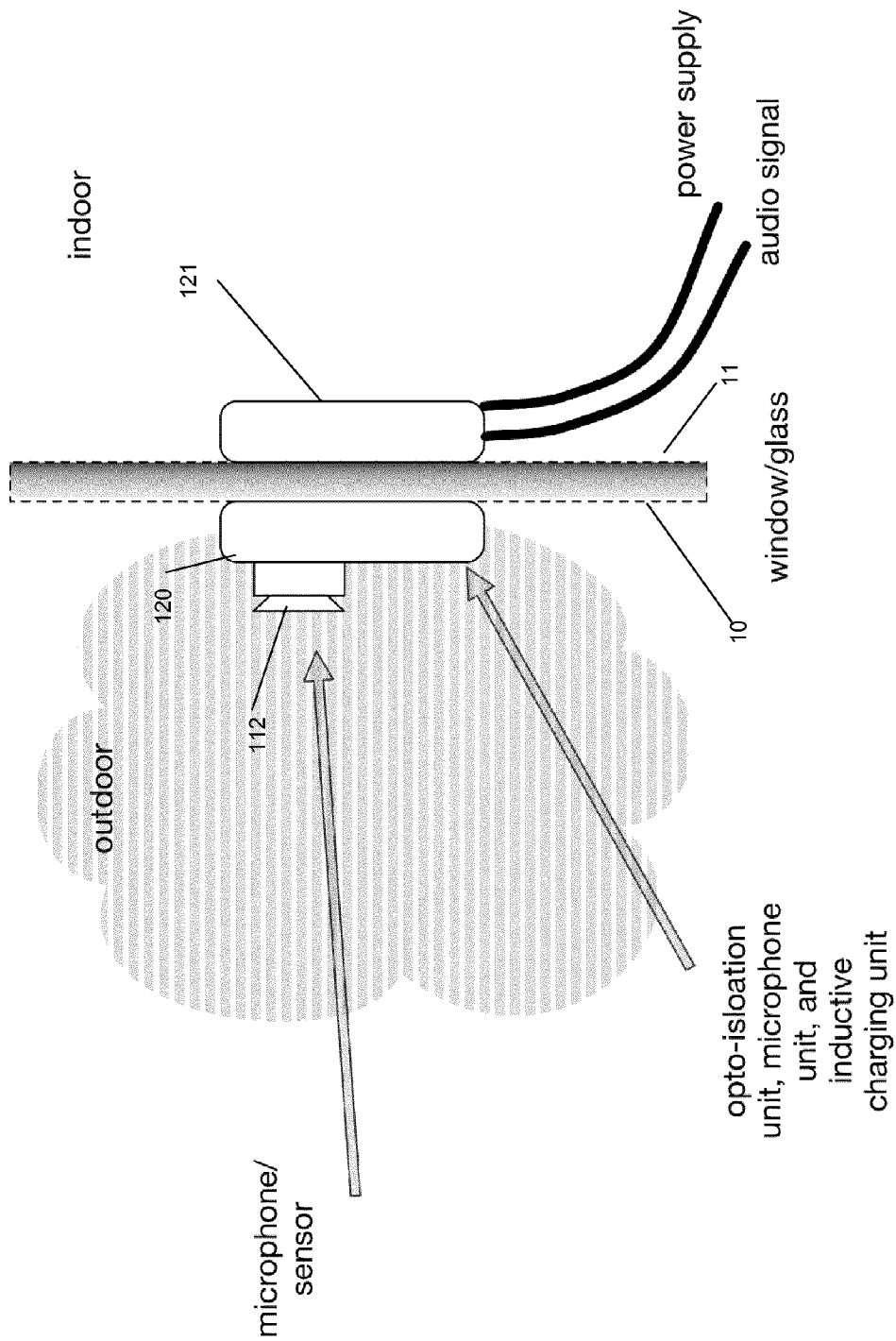
FIG. 9 illustrates a wireless sensing for window/glass surfaces.

In one implementation, a sensor module 110 can be placed exterior to the building in order to capture outdoor soundscapes. For example, the sensor module 110 includes a microphone 112 that can be placed external to a house or apartment exposed to the external environment. On either side, the outdoor/indoor components can be secured to an external building surface 10 and an internal building surface 11, respectfully. For example, the building surfaces 10, 11 can be glass such as a window and the sensor module secured with a suction cup mounting mechanism as commonly used for windshield-based smartphone holding mounting devices. In this situation, the microphone 112 can provide data regarding environmental sound or environment energy types depending on the sensor(s) deployed. In one implementation outdoor, building close-proximity, environmental is accomplished by addressing two important technological problems: wireless signal transmission and wireless power supply in order to simplify installation, deployment, management, and sustainability. Thus, the sensor module 110 comprises in such an embodiment an external sensor module 120 on the exterior surface 10 and an internal sensor module 121 on the interior surface 11. In one example, this includes having the sensor module 110 incorporate opto-isolation circuitry that enables a cable-free communication setup between the external sensor module 120 deployed outdoors and the internal sensor module 121 positioned indoors; where the audio signal is encoded into a sequence of light pulse patterns at the external module 120 (outdoor) and received on the other side (indoor) of the glass/window as shown in FIG. 9

Figure 10:
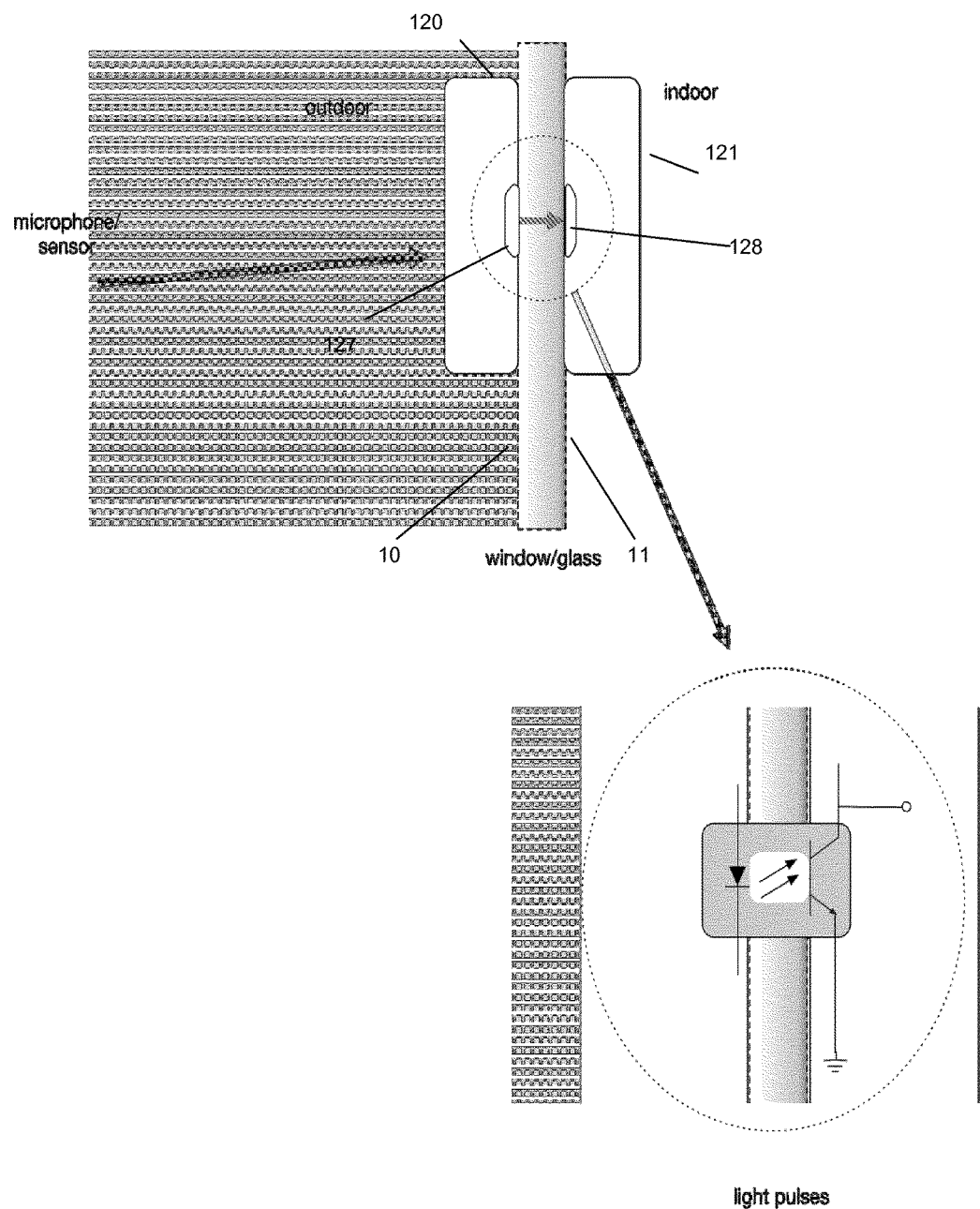
FIG. 10 illustrates an opto-isolation unit for digital data transmission through glass barriers

That is the external module 120 sends a digital audio signal representing the analog audio signal via a sequence of 1s and 0s (or pulses of light bursts: e.g. LED lights) "through" the window from the outside to the internal module 121 via a sequence of light pulses enabled by an opto-isolation transmitter 127 and receiver 128 pair placed outside and inside the window, respectively. On the inside of the window, an opto-isolation receiver 128 captures and translates the sequence of light pulses into a number representing the acoustic energy level captured by the microphone 112 at a specific discrete time. It should be appreciated the signal transmitted by the opto-isolation transmitter 127, however, can be any type of signal including control signals, temperature signals, and "words" (sequence of characters) to communicate information. This is shown in FIG. 10 where the transmitter of light pulses sequences are generated on the external module 120 and the light pulses are received at the indoor side by the internal module 121 to decode the light sequence into a digital signal.

In one embodiment, the sensor module 110 also includes a wireless power supply module 124a, 124b as described as follows. Power can be implemented via batteries and/or via wireless power supply technology through inductive charging. Utilizing inductive resonance systems provides a solution for the charging/power and supply portion to be stored indoors while supplying power to the outdoor microphone unit without the need of cables or special setup—e.g. drilling holes, leaving the windows open, etc. In one implementation, the external module 120 is placed on an exterior surface 10 of a window/glass (or appropriate separator between an interior and exterior space) with an associated inductive charge 127a, 127b. For example, instead of the embodiment as shown in FIG. 4, where the sensor 110 and the microphone 113 are both positioned internal to the building, the microphone 113 can be placed on the exterior portion of the window. This is further clarified in FIG. 11

Figure 11:
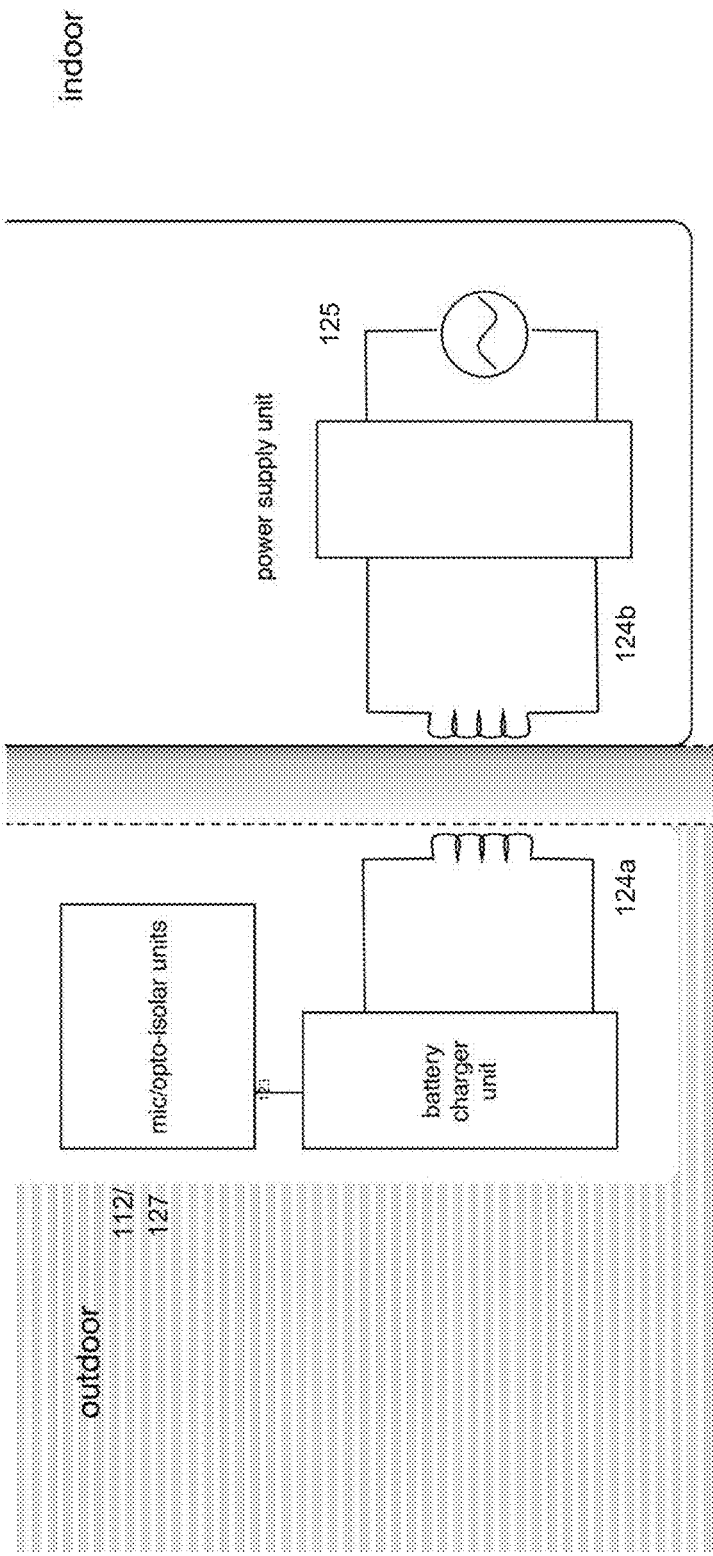
FIG. 11 illustrates inductive resonance for wireless power supply.

As shown in FIG. 11 the outdoor module contains a battery charger 123 for supplying to the microphone 112 and opto-isolation unit 127 and on the inside, power is generated and wirelessly transmitted with an AC current power supply unit 125 through inductor pairs 124a, 124b. In this implementation, no wires are required as part of the outdoor sensing unit.

Figure 12:
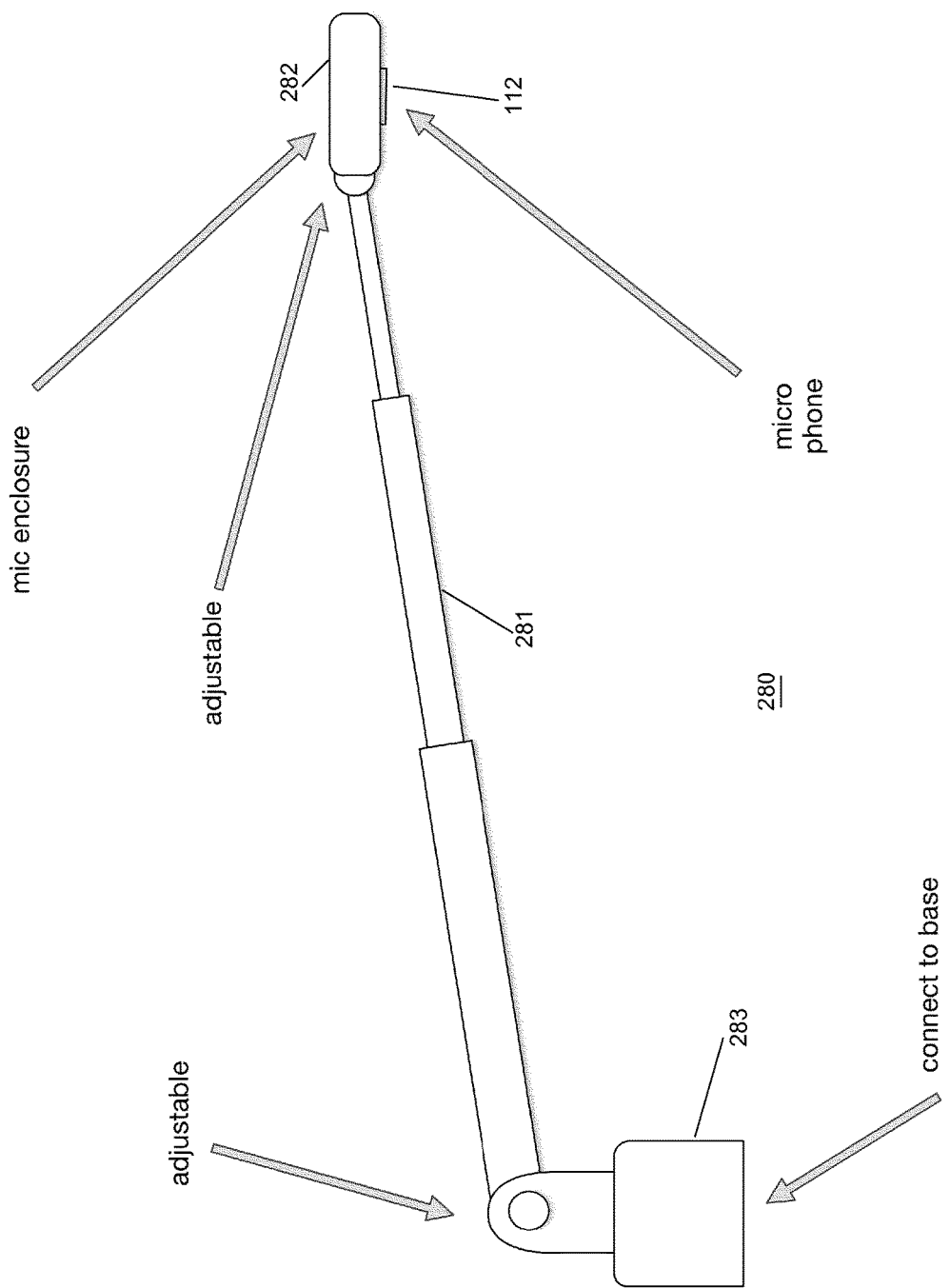
FIG. 12 illustrates a telescoping microphone.
Figure 13:
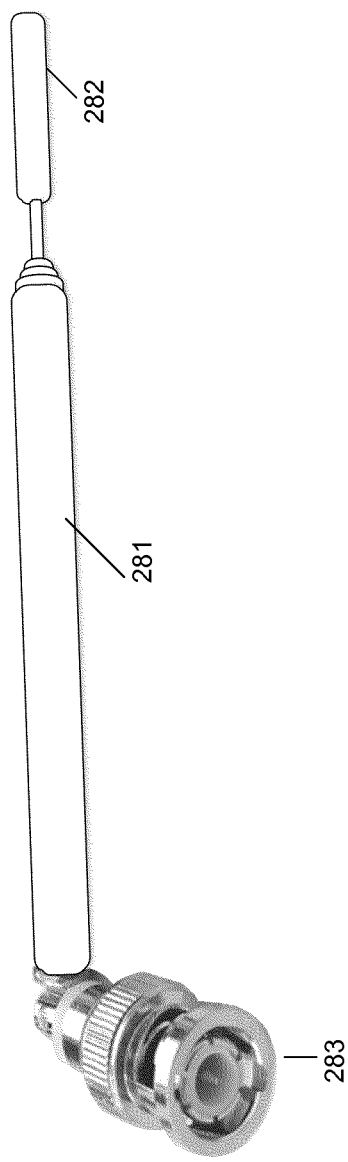
FIG. 13 illustrates a telescoping microphone with a BNC base.
Figure 14:
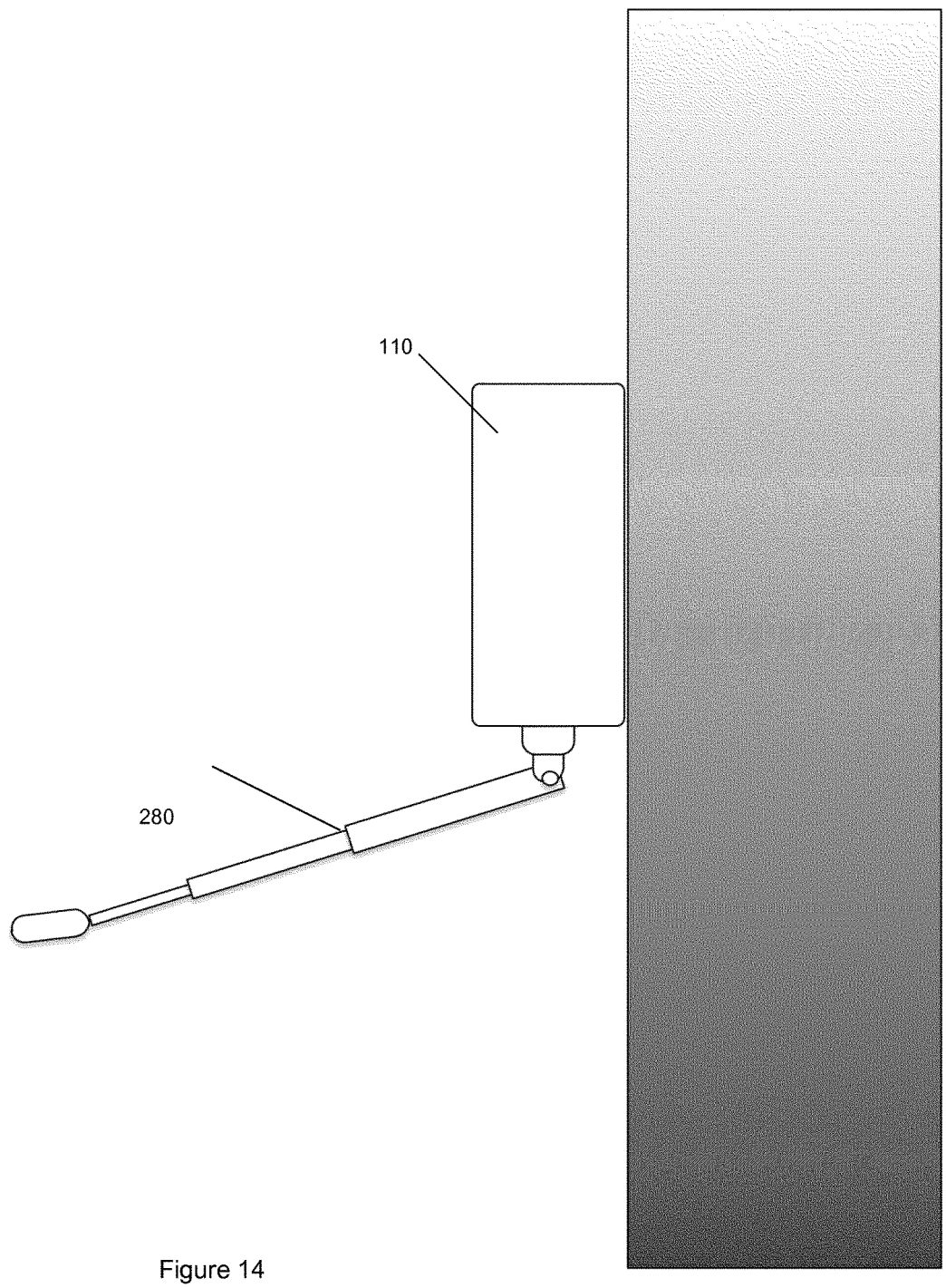
FIG. 14 illustrates an extension of a telescoping microphone from a wall.

In another implementation, the sensor module 110 a flexible and customizable microphone system 280 comprises of a telescoping part 281, a microphone module tip 282, and a telescope base 283 as shown in FIG. 12. The telescope microphone system 280, such as in FIG. 14, enables custom microphone positioning to adjust to different spatial conditions without additional hardware. The telescope 281, which is attached to the base 283, is expandable and can also be rotated to adjust the microphone tip 282 to avoid obstacles with an aim to improve environmental sensing—e.g. unblocking acoustic path for clear acoustic signal reception. The tip 282 of the telescope equipped with a microphone enclosure with one or more microphones 112, is also adjustable providing additional flexibility and customization for optimal environmental signal capture. The cables (signals and ground) run through the telescope 281 and are connected to the base 283. Alternatively the telescope 281 itself can act as the ground. An example of the base 283 is BNC connector, which can seamlessly and securely connect to the sensor box by twisting and securely locking it into place as shown in FIG. 13.

The telescope microphone base 283 may be implemented with different connectors such as, but not limited to, balanced TRS, XLR, Mogami EZ-ID W-2933, and other connector types depending on needs such as multichannel audio—tetra-microphone configurations—and other configurations such as stereo microphones.

In another implementation, a temper evident device is included. For example, the usefulness of the data collection by the microphone may be lessened if a homeowner can alter the environment to artificially dampen the measurement of a soundscape. For instance, the homeowner could move the microphone to a "quieter" location or enclose the microphone to dampen the measurement of a given space. Thus, the tamper evident device may comprise an ultrasonic transmitter and receiver to address tampering. That is, the ultrasonic transceiver includes an transmitter and receiver module to measure the relative surroundings of the device—this includes information about the change in spatio-temporal dimensions of a room, for example. A change in the detection by the ultrasonic pinger may be indicative of the device being moved or being placed into an enclosed space.

In another implementation the remote sensing devices 110 are configured as nodes or modules to form a sensor network 111 to create a distributed network whereby computations for acoustic event detection (AED) and acoustic event classification (AEC) are offloaded to each sensor node. That is, each sensor module 110 conducts AED and AEC individually where only sending results to server 150. The data in this scenario is only sent when an acoustic event exists—when there is silence, no data is sent, thereby saving bandwidth and processing power. Additionally, AED can also be used to only do AEC when an acoustic event is detected. That is, during silence no AEC is computed which again saves processing power and bandwidth. For one embodiment utilizing AEC, a sound class codebook compression (SCCC) method is employed to transmit AEC results. That is, the sensor module 110 and server 150 each have an agreed upon codebook containing code numbers (e.g. integer numbers) to refer to a sound class. For example, a binary sequence of 16 bits can be transmitted where the first four bits (cccc) refer to the class type, second four bits (vvvv) volume, third and fourth set of nibbles to other codes such as brightness and spectral flux: ccccvvvvxxxxyyyy. In this implementation a tremendous amount of bandwidth is saved as data is only sent when an acoustic event is detected, and when it is detected, AES is conducted, and finally a 16 bit code is sent to the server where it is decoded according to a set codebook. The codebook can also be updated on the server side and a new codebook can be sent to each node to modify, grow classes, and add other features to the codebook.

In another implementation the amount of noise is measure using AED and AEC as quantified by the ratio between natural and non-natural sounds. That is natural sound as naturally created sound source: birds, rain, ocean waves, etc. and non-natural sounds as sounds that are machine-based, human-created, including talking, music, and construction sound creation etc. AEC is accomplished via training of machine learning algorithms that detect natural vs. non-natural sounds. Furthermore, by keeping count of acoustic events and their classes, additional information about noisiness can be calculated as acoustic events on a hourly, daily, weekly, or yearly basis as well as other custom time frames.

Figure 8:
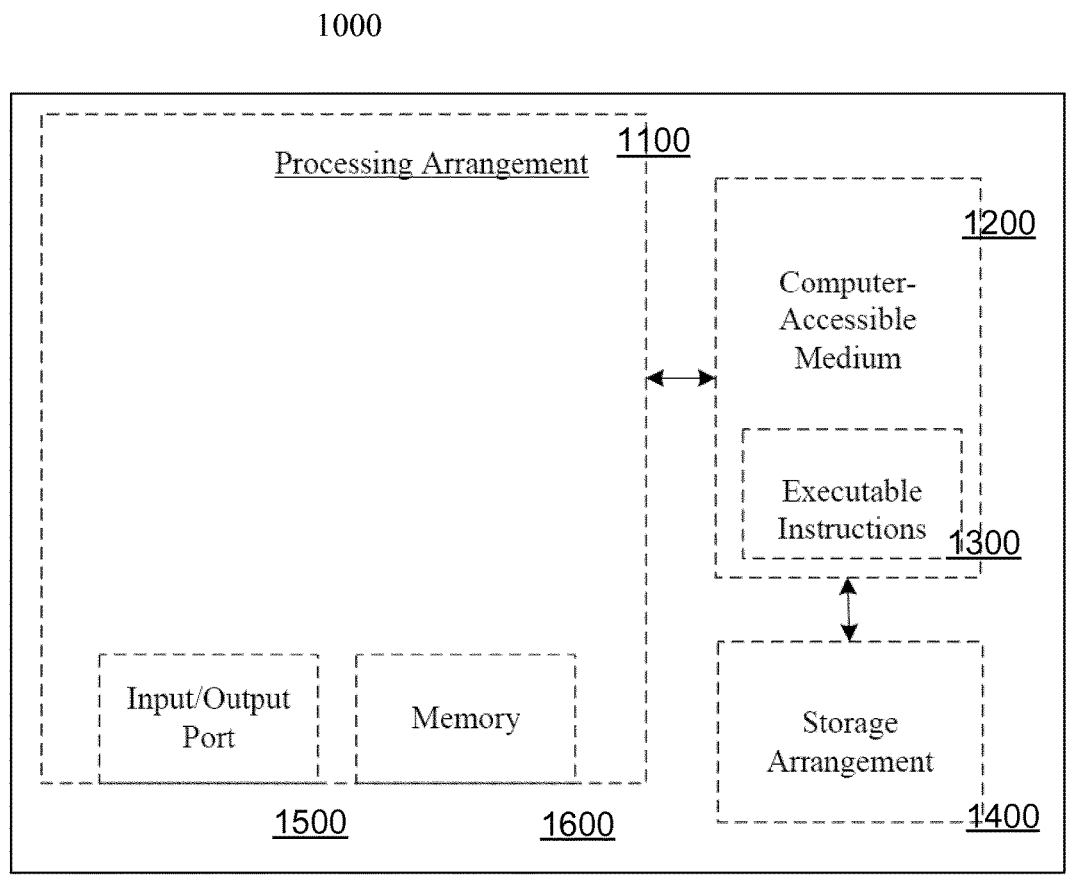
FIG. 8 illustrates a computer system for use with certain implementations.

As shown in FIG. 8, e.g., a computer-accessible medium 1200 (e.g., as described herein, a storage device such as a hard disk, floppy disk, memory stick, CD-ROM, RAM, ROM, etc., or a collection thereof) can be provided (e.g., in communication with the processing arrangement 1100). The computer-accessible medium 1200 may be a non-transitory computer-accessible medium. The computer-accessible medium 1200 can contain executable instructions 1300 thereon. In addition or alternatively, a storage arrangement 1400 can be provided separately from the computer-accessible medium 1200, which can provide the instructions to the processing arrangement 1100 so as to configure the processing arrangement to execute certain exemplary procedures, processes and methods, as described herein, for example.

System 1000 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An environmental analysis system comprising:
   an environmental analysis main device including a first central processing unit and a first communication module, the environmental analysis main device in communication with a server;
   a plurality of remote sensing devices each having at least one microphone, a second central processing unit, a second communication module, and a power source, each second communication module of the plurality of remote sensing devices in communication with the first communication module of the environmental analysis main device;
   one or more loudspeakers each associated with one or more of the plurality of remote sensing devices; and
   an external module having a microphone in communication with an opto-isolation transmitter paired with an opto-isolation receiver in communication with the environmental analysis main device.

2. The environmental analysis system of claim 1, wherein the plurality of remote sensing devices further comprise one or more of a moisture sensor, temperature sensor, accelerometer, air quality sensor, light sensor, color sensor, and electromagnetic radiation sensor.

3. The environmental analysis system of claim 1, wherein the server includes a machine learning module.

4. The environmental analysis system of claim 1, wherein the power source is a wireless power source in communication with the microphone of the external module.

5. The environmental analysis system of claim 1, further comprising a tamper evident device.

6. The environmental analysis system of claim 5, wherein the tamper evident device includes an ultrasonic emitter and receiver.

7. The environmental analysis system of claim 1, wherein the environmental analysis system further comprises a contact microphone in communication with one of the plurality of remote sensing devices.

8. The environmental analysis system of claim 1, further comprising at least one of the plurality of remote sensing devices having a telescoping microphone system, the telescoping microphone system having the microphone of the at least one of the plurality of remote sensing devices disposed on a tip.

\* \* \* \* \*